United States Patent
Lecomte et al.

(10) Patent No.: US 6,705,766 B2
(45) Date of Patent: Mar. 16, 2004

(54) EASY-TO-MOUNT OPTICAL CONNECTOR SYSTEM

(75) Inventors: Fabrice Lecomte, Saint-Mars d'Outiller (FR); Jean-Max Badeau, Montfort le Gesnois (FR); Patrick Pignot, Le Mans (FR)

(73) Assignee: FCI, Paris (FR)

( * ) Notice: Subject to any disclaimer, the term of this patent is extended or adjusted under 35 U.S.C. 154(b) by 30 days.

(21) Appl. No.: 10/095,560

(22) Filed: Mar. 11, 2002

(65) Prior Publication Data

US 2003/0138217 A1 Jul. 24, 2003

(30) Foreign Application Priority Data

Jan. 24, 2002 (EP) .............................. 02100056

(51) Int. Cl.$^7$ .............................. G02B 6/36; G02B 6/38
(52) U.S. Cl. .............................. 385/78; 385/56; 385/60; 385/62; 385/81
(58) Field of Search .............................. 385/56, 58, 60, 385/62, 66, 78, 81, 84

(56) References Cited

U.S. PATENT DOCUMENTS

| | | | | |
|---|---|---|---|---|
| 4,738,508 A | | 4/1988 | Palmquist | ................ 350/96.21 |
| 4,898,446 A | * | 2/1990 | Hinckley | ..................... 385/72 |
| 6,151,432 A | * | 11/2000 | Nakajima et al. | ............. 385/60 |

FOREIGN PATENT DOCUMENTS

EP          0366346 A2      5/1990

* cited by examiner

*Primary Examiner*—Akm Enayet Ullah
*Assistant Examiner*—Omar Rojas
(74) *Attorney, Agent, or Firm*—Perman & Green LLP

(57) ABSTRACT

An optical connector comprising a housing and a channel in this housing to receive an optical cable therein is preferably mounted in an optical contact having several parts, including a front part constituted by a connection ferrule and a sleeve used to prevent the rotation of the optical fiber inside the channel. The retention of the optical contact inside the channel is provided by a catch which has, for example, a bayonet mounted around the optical fiber that co-operates with a recess of an inner wall of the channel. A spring is positioned around the optical fiber to hold the bayonet in a return of the recess.

9 Claims, 2 Drawing Sheets

EASY-TO-MOUNT OPTICAL CONNECTOR SYSTEM

BACKGROUND OF THE INVENTION

1. Field of the Invention

An object of the present invention is a system of optical connectors, namely a system of connectors used for to interconnect optical fiber sections. The aim of the invention is to enable the easy mounting and dismounting of the optical connectors contained in such a system, while at the same time providing for the easy mounting of the optical contacts themselves to the ends of the cables, the optical contact being then inserted into these optical connectors

2. Description of the Prior Art

There is, in particular, a known optical contact in the prior art mounted at one end of a cable and having at least one elastic strip or clip on an external rim. In a preferred embodiment, the contact has several elastic clips positioned evenly and symmetrically with respect to an axis of symmetry of the cable. These elastic clips extend slightly beyond the external rim of the contact and may be folded down against this contact when the optical fiber is inserted into a channel of a complementary connector. When the contact is inserted into the channel, the clips are stressed beforehand against the external rim of the contact. Then, when the contact has been plunged in to the maximum extent, for example when it stops against shoulder of the channel, the channel is designed in such a way that it has a hollow with a greater diameter wherein the elastic clips can get freely released. Once the elastic clips are released, they come to rest against a ring formed by this widening. The released elastic clips and the ring co-operate to prevent the optical fiber from coming out of the channel.

In the prior art, to bring the optical fiber out of this channel, a specific tool has to be used. The tool used folds down the released clips, being inserted from a connection face of the connector while the contact is inserted from a rear face. The tool used corresponds to a hollow cylinder sliding along the contact in the channel so as to stress the elastic clips along the external rim of the contact. Once these elastic clips have been folded down along the body, this contact can be withdrawn by the exertion of a tensile force on the optical face that extends beyond the rear face side of the connector.

This approach poses a problem. It may be dangerous to use a tool to obtain the exit of the optical fiber from the connector. Indeed, there is a risk that the tool might damage the connection end of the contact when it is inserted into the connection front face side. Furthermore, this approach entails a substantial space requirement. In particular it necessitates the obligatory and total disconnection of its complementary connector, for the disconnection tool is inserted from this connection front face of the connector.

In the prior art, there is the known teaching of the document EP-A-0 366 346 which describes a connector assembly comprising an optical contact mounted at one end of a cable and a complementary connector to receive this cable. The optical contact is inserted from a rear face into the connector. It has a ferrule and a sleeve mounted around the ferrule to associate this ferrule with the end of the cable. The ferrules essentially fulfill a mechanical grasping function to grasp the brittle end consisting of the optical fiber contained in the cable. Furthermore, the optical contact comprises a rear part around the cable. This rear part consists of an extension of the sleeve.

A fastening means with an elastic clip is mounted around this rear part. The rear part represents a section of the sleeve with a smaller diameter. According to this document, the complementary connector has a slot on the outer rim. The elastic clip extends beyond this slot when it is inserted therein. It is therefore no longer necessary to disconnect the connector from its complementary connector in order to withdraw an optical contact. On the contrary, this approach raises problems of tight sealing in the channel in which the contact is placed.

On the whole, this prior art approach raises a first problem because it always imperatively necessitates specialized tooling in order to be able to disengage an optical contact of this kind from a channel of the connector into which it is inserted. Indeed, the elastic clip co-operates with the groove of the channel from which it cannot come out without the exertion of pressure on the edges of this clip which extends beyond the slot on one side or the other.

The solution described here about raises a second problem owing to the fact that the catching system is a small part mounted on the sleeve. This part is necessarily held back in translation in order to prevent it from being lost or damaged during handling. Now, since the sleeve is fixedly joined throughout its length with the optical cable that it surrounds, the mobility of this part is limited. This makes it necessary to plan either for either very long sleeves which are difficult to mount or for handling operations in this very limited space just at the level of the connector.

This approach finally raises a third problem because, to be able to accurately fit the elastic clips into the groove of a channel of the complementary connector, it is necessary to place them so that they face each other. For this purpose, the fastening means has a longitudinal strip forming an added thickness on an external rim, to co-operate and thus orient the fastening means in the channel. Indeed, this strip must get inserted into a slot designed in the rim of the channel. The fitting in of this strip into the slot requires a rotational motion in order that it may be accurately presented. Now, if this handling has to be done by means of a set of tools, then the teaching of this document does not make it possible, any more than the other approaches of the prior art, to resolve the problem of the easy mounting of an optical contact in its complementary connector.

In the prior art, there are known fastening means that can be used manually and do not require the use of specialized tooling whether for mounting or for dismounting. Such means include, for example, the bayonet device as described in the document U.S. Pat. No. 4,738,508. According to this document, the bayonet is designed in such a way that the optical contact has a sleeve provided with a slot at the end of the optical cable. The slot designed to receive a pin on the periphery of the outer wall of a complementary connector of the contact. However, this approach raises a problem because to ensure that the contact is kept in the connector, the contact additionally has a second internal pin extending radially with respect to the optical fiber and having to co-operate with a slot made in the inner wall of the complementary connector. Indeed, this assembly requires excessively painstaking handling of the contacts and complementary connectors.

Finally, despite all the precautions, it would seem that, after a certain period of use, an optical connector of this kind is the site of transmission losses. It is therefore necessary to change or clean the optical fibers. This cleaning is difficult, given the penetration depth of the ends of the optical fibers, especially in female contacts. The easy withdrawal of the optical fiber from its connector enables easier cleaning and above all individual cleaning on the basis of identified needs without requiring a total dismounting of all the optical contacts.

SUMMARY OF THE INVENTION

The aim of the invention is to overcome these problems by proposing an optical contact such that an optical cable can be mounted and dismounted therein and furthermore such that this optical contact is itself easily to mount and dismount in a connector in which it may be placed. The solution of the invention enables mounting and dismounting by hand. Indeed, in the invention, it is planned especially that the rear part with the catching means will be easy to grasp and will slide along the optical cable. In sliding, the rear part can come close to the end of the cable where the ferrule and the sleeve are mounted. The fact that these parts come closer to each other also enables the insertion of the rear part into the channel of the connector which already receives the ferrule, the sleeve and the cable. This rear part then cooperates by rotation with a complementary recess designed on an inner wall of the channel to retain the contact totally within the connector.

Another advantage of the invention is that it procures tolerance of variations related to the expansion of materials, especially when they are placed in severe climatic conditions. This tolerance comes from the fact that the rear part is not directly attached to the cable but is really a sliding part.

In the preferred embodiment, to ensure tight sealing at this rear sliding part, this part has at least two seals: an internal seal between an inner wall and the cable, and an outer seal between an outer wall and an inner wall of the channel of the connector in which the contact is mounted. Since these seals are preferably O-rings, they do not hamper the mobility of the rear part along the cable.

An object of the invention therefore is an optical contact mounted around an optical cable, the optical contact comprising a ferrule mounted at one end of the cable, a sleeve fixedly holding the cable and the ferrule, and a catch mounted around the cable and designed to co-operate with a complementary connector in order to hold the optical contact therein in a channel of the complementary connector, wherein the catch is mounted on a rear part of the contact and this rear part slides along the cable, the catch being capable of being engaged by rotation in the inner wall of the channel.

BRIEF DESCRIPTION OF THE DRAWINGS

The invention will be understood more clearly from the following description and from the accompanying figures. These figures are given purely by way of an indication and in no way restrict the scope of the invention. Of these figures.

MORE DETAILED DESCRIPTION

Figure 1:
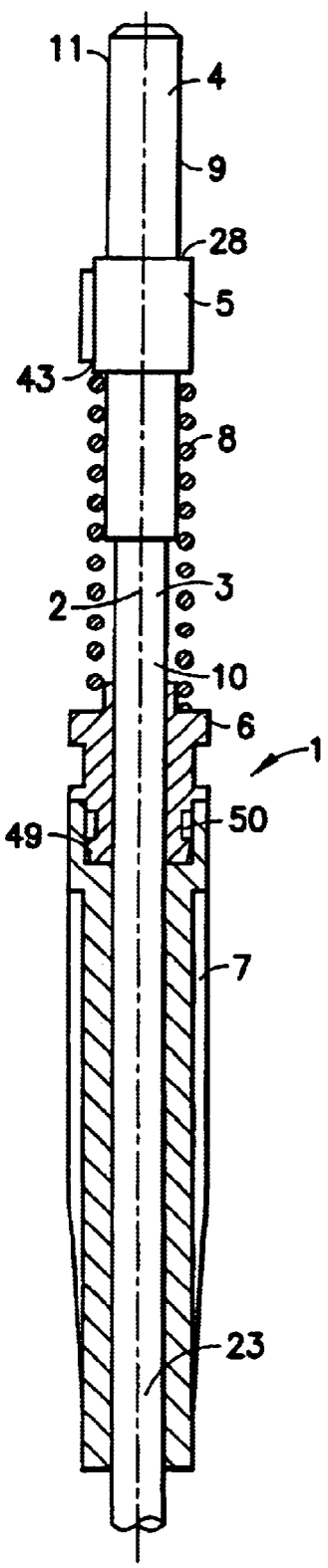
FIG. 1 is a longitudinal sectional view of a first embodiment of an optical contact according to the invention.

FIG. 1 shows an optical contact 1 mounted around an optical fiber 2, the optical fiber 2 being protected by a protective cable 3. In a first approach, the optical fiber slides freely inside the cable 3. This is then called a loose-tubed structure. In a second approach, the optical fiber 2 is totally held by the cable 3. This is a tight-buffered cable structure. This type of cable is especially suitable for use in the field of aeronautics. In this second approach of the invention, any shift exerted on the cable 3 necessarily entails an identical shift in the fiber 2 and vice versa.

The optical contact 1 has a ferrule or end piece 4, a sleeve or end piece support 5, and a catching means 6 on a rear part 7 of the optical contact. Preferably, the optical contact 1 has a spring 8 also mounted around the cable 3 between the sleeve 5 and the rear part 7.

The cable 3 and the ferrule 4 are held in the sleeve which is held both on an external rim 9 of the ferrule 4 and on an external rim 10 of the cable. The sleeve 5 is held at one end of the cable 3. The sleeve 5 is preferably cylindrical. The optical cable 3 is fixedly joined to the ferrule 4 and the sleeve 5, in being held by this cylindrical sleeve 5. For example the cylindrical sleeve 5 is crimped on to the cable 3. The ferrule 4 is preferably made of ceramic. It is force-fitted into the cylindrical sleeve 5. The ferrule 4 and the cylindrical sleeve 5 may also be made of metal, and may form a single monobloc piece mounted at the end of the cable 3 in the same way.

The cable 3 is aligned with the ferrule 4 in such a way that the optical fiber 2 is aligned in the ferrule 4. The ferrule 4 forms a connection end 11 of the optical contact 1.

The catch 6 is usually small-sized. It is preferably associated with the rear part 7, to which it is fixedly joined, so that it can be mounted more easily on a complementary connector 12 shown in FIG. 2. The rear part 7 and the catch 6 slide along the cable 3. They are independent of the ferrule 4 and of the sleeve 5.

The rear part 7 is positioned around the optical cable 3 and has an elongated shape along this cable. The rear part 7 is preferably flexible and made of elastomer. This rear part 7 forms a "nipple".

Thus, any force or longitudinal or rotational motion exerted on the rear part 7 is converted into an identical action applied to the catch 6. Since the rear part 7 is long, it enables easy handling of the catch 6.

Furthermore, the rear part 7 acts as an additional sheath for the optical cable 3 especially at an aperture 13 from which the contact 1 comes out when it is inserted into the complementary connector 12. Thus, there is no risk of folding the optical fiber 2 at the aperture 13 and making it undergo an angle of 90° which could be damaging. The rear part 7 mechanically supports at least one portion of the optical cable coming out of a channel 14 formed in the connector 12 and opening out at the level of a rear face 15. This rear part 7 thus protects the optical fiber 2 from excessive curvature. The rear part 7 forms a cladding around the cable 3. The rigidity of the cladding decreases at a rear end, thus gradually giving the cable its flexibility.

Figure 2:
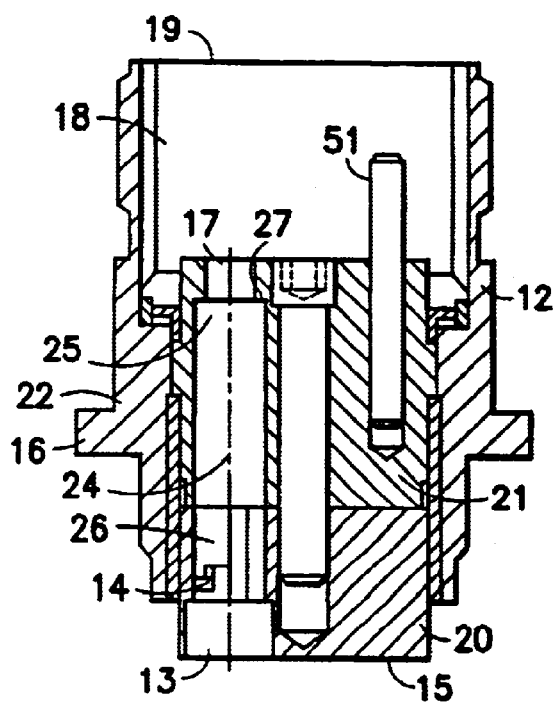
FIG. 2 is a longitudinal sectional view of complementary connector of an optical contact according to the invention.
Figure 3:
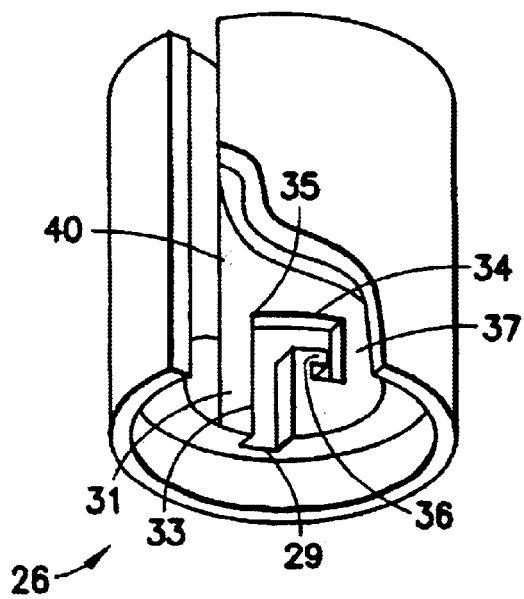
FIG. 3 is a partially cut-away view of a section of the connector receiving the contact according to the invention.

FIG. 2 shows the complementary connector 12 designed to receive the optical contact 1 in its canal 14. The complementary connector 12 has a housing 16 in which the channel 14 is formed. The channel 14 is designed to receive the optical contact 1 mounted on the optical cable 3. In particular, the channel 14 comprises the aperture 13 at the level of the rear face 15 of the housing 16. Preferably, the optical contact 1 is inserted into the aperture 13 from this rear face 15. Furthermore, the channel 14 comprises an exit hole 17 allowing the connection end 11 to extend beyond at least up to a receiving cavity 18 formed at a front face 19 of the complementary connector 12. The front face 19 is opposite the rear face 15.

A complementary optical contact such as 1 may be connected with the connection end 11 if it faces the front face 19, and is inserted into the receiving cavity 18, so as to get positioned before the connection end 11.

In one variant, the complementary connector 12 may receive several optical contacts such as 1. In this case, each of the connection ends such as 11 of these optical contacts mounted into the connector 12 are in the receiving cavity 18. In a preferred embodiment, the housing 16 has several assembled units.

In the example shown in FIG. 2, the housing 16 has a rear portion 20, a front portion 21 and an external portion 22. The external portion 22 enables the association of the rear portion 20 and the front portion 21. Furthermore, the external portion 22 has borders at the front face 19 to enable the formation of the receiving cavity 18. Furthermore, the external portion 22 has an external rim enabling the complementary connector 12 to be accurately connected with a complementary device. This complementary device may have optical contacts that are themselves complementary to the optical contacts such as 1.

The complementary connector 12 may, without distinction, be a male connector or a female connector depending on the shape proposed by the housing 16.

The optical fiber 2 as well as the optical contact 1 comprise an identical axis of elongation 23. The channel 14 designed to receive the optical fiber 2 preferably has a generally cylindrical shape, and comprises a central axis 24. To ensure accurate insertion of the optical contact 1 into the channel 14, it is necessary for the axis of elongation 23 to be aligned with the central axis 24, when the optical contact 1 faces the aperture 13.

The ferrule 4 preferably has a cylindrical shape. The channel 14 has an inner diameter with a size just sufficient to receive an external diameter of the cylinder formed by the ferrule 4. Thus the ferrule 4 does not float in the channel 14. The front channel portion 25 crossing the front portion 24 has an inner diameter slightly greater than the diameter of the rear channel 26 crossing the rear portion 23. Nevertheless, at the output orifice 17, this front channel portion 25 has a slightly smaller diameter. Thus, the channel 14 has inner shoulders 27 to limit the penetration of the optical contact 1 into the channel 14. Indeed, an edge 28 of the cylindrical sleeve 5 is designed to abut the shoulder 27.

The optical contact 1 is retained in the complementary connector 12 by means of the catch 6. It must be noted that only the catch 6 and, therefore, the rear part 7 can rotate about the axis 23 and the cable 3, precisely to enable the catch 6 to be properly engaged in a complementary recess 29 of the channel 14.

Figure 4:
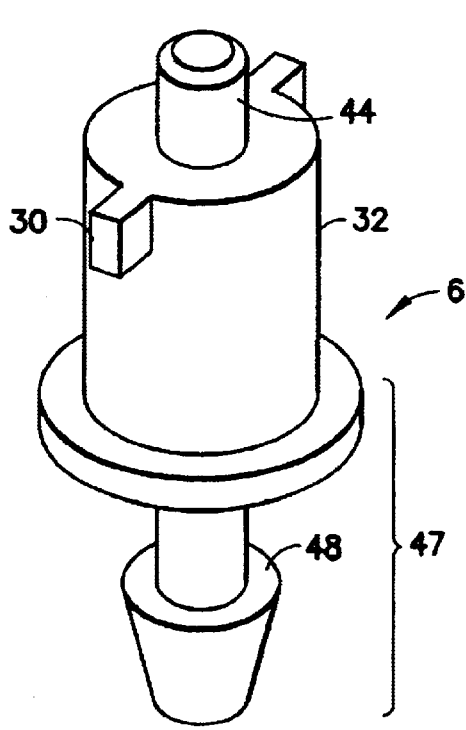
FIG. 4 is an external view of a catch of an optical contact according to the invention.

FIG. 4 shows a first embodiment in which the catch 6 has at least one external protruding feature 30 to form a bayonet designed to co-operate with the complementary raised feature 29 provided on an internal wall 31 of the channel 14. The protruding feature 30 corresponds for example to a parallelepiped or cylindrical pin raised perpendicularly to an external wall 32 of the catch 6. In a preferred embodiment, the complementary recess 29 is preferably formed in the rear channel portion 26.

For example, the complementary recess 29 forms an internal hollow in the inner wall 31, for example a guide way in which the protruding feature can move. The guide way 29 is elbowed. The guide way 29 preferably has a first section 33 and a second section 34, the second section 34 being separated in the first elbow 35 of the first section 33. The internal hollow 29, namely the first section 33, has a length along the central axis 24 that is limited in order to limit the penetration of the protruding feature or pin 29 into the channel 14. The first elbow 35 is preferably made at an angle of about 90°, and prevents a further longitudinal penetration of the catch along the central axis 24.

Furthermore, the guide way 29 has a return 36 at one end 37 of the second section 34. This return 36 is preferably formed so as to present a second elbow forming an acute angle between the second section 34 and this return 36, so that the pin 30 can be received in a "dead end". The guide way 29 is preferably J-shaped.

Should the catch have several protruding features, the internal wall correspondingly has an equivalent number of guide ways to receive them respectively.

In a preferred embodiment, the catch 6 has two pins such as 30. In this example, the pins 30 are diametrically opposite. These two pins such as 30 then work respectively with two recesses such as 29 each comprising a guide way formed in such a way that a same rotation applied to the catch 6 enables a locking of the two pins such as 30 into the two returns such as 36. A configuration of this kind prevents the creation of an angle between the elongation axis 23 and the central axis 24 when the optical contact 1 is inserted into the channel 14.

Figure 5:
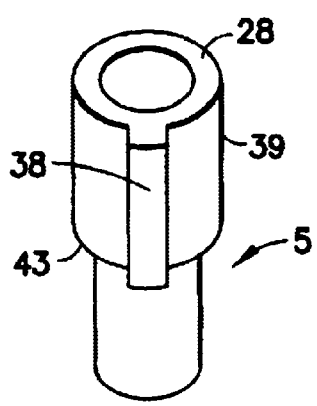
FIG. 5 is an external view of a sleeve of an optical contact according to the invention.

When the optical contact 1 is mounted into the complementary connector 12, first of all the ferrule 4 and, in conjunction, the cylindrical sleeve 5 are inserted into the channel 14. To prevent a rotation of the ferrule 4 in the channel 14 after positioning and thus prevent friction which could take place between the connection end 11 and a complementary contact, the cylindrical sleeve 5 has a ridge 38 on an external rim 39. This ridge 38, shown in FIG. 5, is designed to co-operate with a guide rail 40 formed in the inner wall 31 of the channel 4. The wedge 38 is formed in parallel to the elongation axis 23. This ridge 38 co-operates with the guide rail 40 provided in the channel portions 25 and 26 up to the level of the exit orifice 17.

In one variant, it can be planned that the ferrule 4 will have a guide rail such as 40 to co-operate with a corresponding complementary ridge on the internal wall 31 of the channel 14.

The optical contact 1 is pushed into the channel 14 until the front edge 27 of the cylindrical sleeve 5 abuts the edge 26. Then the catch 6 is itself limited in translation in the channel 14.

As and when the optical contact 1 penetrates along the central axis 24, the first section 33 of the guide way receives the pin 30. As needed, a preliminary rotation of the catch 6 is effected around the cable 3 to present the pin 30 facing the first section 33.

Figure 6:
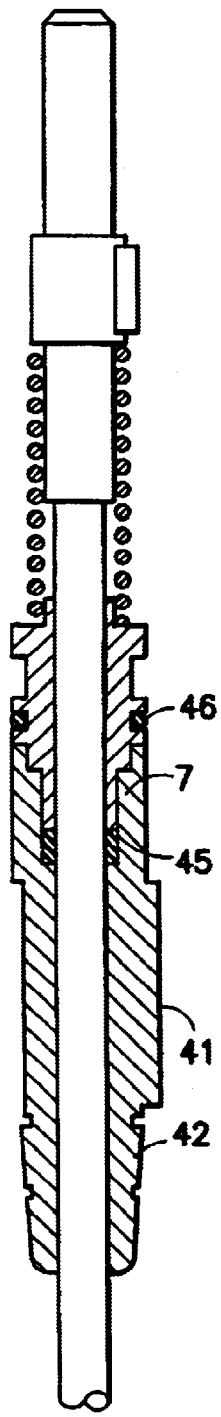
FIG. 6 is a longitudinal sectional view of a second embodiment of an optical contact according to the invention.

To this end, as shown in FIG. 6, an alternative embodiment of an optical contact 1 has a locator 41 at the level of an external rim 42 of the rear part 7. This locator 41 is used, during a operation of manipulation by hand, to identify the relative position of the rear part with respect to the cable 3. Preferably, the catch 6 with the pin 30 is mounted in such a way on the rear part 7 that the locator 41 is in an alignment of the pin 30 parallel to the axis of elongation 23 thus facilitating the handling of the contact 1

Then the pin 30 abuts the first elbow 35 and, to engage the pin 30 in the second section 34, the rear part 7 is rotated, presenting the catch 6 about the axis 23. In a preferred embodiment, a width of the second section 34 corresponds to a rotation by about 60° of the catch 6 inside the channel 14.

When the pin 30 abuts the second acute-angled elbow 37, the optical contact 1 is further plunged into the channel 14 along the axis 24, and a rotation is made in reverse to the first rotation so as to engage the pin 30 in the return 36.

Thus the mode of locking the optical fiber 2 in the channel 14 ensures that there is a known and fixed position for the connection end in the receiving cavity 18, to enable high quality optical connection with a complementary optical contact.

To ensure the exit of the pin 30 from this guide way, it is necessary to travel through the reverse path and make reverse rotations and reverse longitudinal movements with respect to the axis 24 to enable the exit of the optical contact 1.

To hold the pin 30 in the return 36, the contact 1 comprises the spring 8 which actively pushes back the catch 6 with this pin 30 towards the rear face 15 of the connector 12, from which the contact has been introduced.

To ensure that the pin 30 of the catch 6 remains blocked in the return 36 of the guide way, the spring 8 is compressed between the cylindrical sleeve 5 and the catch 6, namely between the cylindrical sleeve 5 and the rear part 7. The spring 8 is mounted around the cable 3. The spring 8 is at an end supported against a rear edge 43 of the sleeve 5. The rear edge 43 is opposite the front edge 28 presented by this same sleeve 5. Furthermore, at another end, the spring 8 is supported by a ring 44 of the catch 6.

Inside the channel 14, the spring 8 gets compressed between the rear edge 43 and the ring 44. The spring 8 therefore pushes back the catch 6 towards the rear face 15 and thus, in the first embodiment, maintains the position of the pin 30 in the return 36 of the guide way 29. Furthermore, the spring 8 ensures a maximum penetration of the connection end 11 into the channel 14 so as to ensure that it has a definite position, in keeping the front edge 28 stopped against the inner shoulders 26.

Indeed, to disengage the pin 30 from this return 36 the spring 8 must be further compressed to enable a longitudinal movement along the axis 24 of the catch 6 towards the front face 19. Only thereafter is it possible to carry out a rotation of the pin 30 in the second section 34. When the pin 30 is placed at the level of the first elbow 35, the spring 8 automatically ejects the bayonet 6 out of the recess 29.

In FIG. 6, the rear part 7 has a first seal 45 held in a notch formed in an inner wall of the rear part 7. This seal 45 is preferably an O-ring and comes into contact with the external rim 10 of the cable 3 in a hermetically sealed way. Thus, the inner seal 45 provides for the tight sealing of this connection.

Furthermore, when the optical contact 1 is inserted into the channel 14, the rear part 7 comes into contact with the inner wall 31 at the level of the rear channel portion 26. At this level, the rear part 7 is surrounded by a second external seal 46 that gets compressed between the external rim 42 of the rear part 7 and the inner wall 31. Thus, the rear part 7 maintains the tight sealing of the complementary connector 1 at the rear face 15, in acting on both the inner and the outer rims of the optical contact.

In a second embodiment, the catch 6 has a thread on its external rim that co-operates rotationally with a complementary thread on the inner wall 31 of the channel 14.

The catch 6 is fixedly joined to the rear part 7. In a first example, the catch 6 has a rear end 47 in the shape of a harpoon 48 to co-operate with an inner wall 49 of a cavity 50 of the rear part 7. In a second example, the inner seal 45 is positioned in such a way that it is stressed between the cable 3 and inner walls of the catch 6, which are themselves stressed, under the effect of the inner seal 45, against the inner walls 49 of the cavity 50 of the rear part 7.

The complementary connector 12 may furthermore have realignment means 51. A realignment means may extend into the receiving cavity 18 or else be a receiving cavity to receive the complementary alignment device of the complementary connector.

What is claimed is:

1. An optical contact mounted around an optical cable, the optical contact comprising a ferrule mounted at one end of the cable, a sleeve fixedly holding the cable and the ferrule, and a catch mounted around the cable and designed to co-operate with a complementary connector in order to hold the optical contact in a channel of the complementary connector, wherein the catch is mounted on a rear part of the contact and this rear part slides along the cable, the catch being engaged by rotation in the inner wall of the channel.

2. An optical contact according to claim 1, wherein the rear part comprises an internal seal positioned between the cable and an inner wall of the rear part, and comprises an external seal around this rear part, the external seal being capable of co-operating with the inner wall of the channel.

3. An optical contact according to claim 1, wherein the catch comprises a protruding feature to co-operate with a recessed guide way of the inner wall of the channel, the catch being pushed back by a spring compressed between a ring of the catch and an edge of the cylindrical sleeve.

4. An optical contact according to claim 3, wherein the guide way has the shape of a J.

5. An optical contact according to claim 3, wherein the catch comprises two side protuberances to co-operate respectively with two diametrically opposite recesses in the inner wall.

6. An optical contact according to claim 1, wherein the catch has a screw thread to co-operate with a complementary thread of the complementary connector.

7. An optical contact according to claim 1, wherein the rear part of the optical contact is flexible and provides mechanical support to a portion of the optical fiber coming out of the channel at a rear face of the complementary connector.

8. An optical contact according to claim 1, wherein the sleeve has an anti-rotation ridge to co-operate with a guide rail of the inner wall of the channel.

9. Optical connector assembly comprising an optical contact mounted around an optical cable and a complementary connector to receive the optical contact in a channel of the connector, the optical contact being held in the channel by co-operation between a protruding feature of the contact and a recess of the channel, wherein the protruding feature of the optical contact is on a rear part sliding along the cable, and wherein the contact is engaged and held in the channel by a rotational motion of the rear part with respect to the complementary connector.

* * * * *